United States Patent [19]

Nyquist

[11] Patent Number: 5,673,111
[45] Date of Patent: Sep. 30, 1997

[54] METHOD AND ARRANGEMENT FOR MEASURING DISTANCE

[75] Inventor: Per Nyquist, Onsala, Sweden

[73] Assignee: Limab Laser & Instrumentmekanik AB, Sweden

[21] Appl. No.: 491,873

[22] PCT Filed: Jan. 11, 1994

[86] PCT No.: PCT/SE94/00011

§ 371 Date: Jul. 11, 1995

§ 102(e) Date: Jul. 11, 1995

[87] PCT Pub. No.: WO94/16289

PCT Pub. Date: Jul. 21, 1994

[30] Foreign Application Priority Data

Jan. 11, 1993 [SE] Sweden .................................. 9300047

[51] Int. Cl.$^6$ ................................................ G01B 11/14
[52] U.S. Cl. ............................................................ 356/375
[58] Field of Search ............................... 356/375, 3.01, 356/3.06, 3.07, 4.01

[56] References Cited

U.S. PATENT DOCUMENTS 4,973,152  11/1990  Brunk ........................ 356/3.06
5,056,922  10/1991  Cielo et al. .................. 356/376
5,307,207  4/1994  Ichibara ....................... 359/622

FOREIGN PATENT DOCUMENTS 0318249  5/1989  European Pat. Off. .
0332781  9/1989  European Pat. Off. .
0398563  11/1990  European Pat. Off. .
3921956  12/1990  Germany .

*Primary Examiner*—Richard A. Rosenberger
*Attorney, Agent, or Firm*—Lerner, David, Littenberg, Krumholz & Mentlik

[57] ABSTRACT

Method and arrangement for measuring distance, in which an area (5) on a measured object (2) is illuminated with light from a laser-light source (3). After reflection, the light reproduces the illuminated area on a detector arrangement (7), placed at the side of a line through the light source (3) and the illuminated area. The detector arrangement (7) consists of a number of detector elements (14). With the aid of a scanning device the image of the area (5) is scanned with respect to light intensity and the light intensity-dependent output signals from each of the detector elements obtained during scanning is accumulated in an evaluation device.

11 Claims, 3 Drawing Sheets

METHOD AND ARRANGEMENT FOR MEASURING DISTANCE

TECHNICAL FIELD

The present invention relates to a method for measuring distance according to the preamble of claim 1.

The present invention also relates to an arrangement for measuring distance according to the preamble of claim 5.

STATE OF THE ART

Non-contact methods of measuring lengths, thicknesses and distances are used in many industrial applications. With these measurements a high measuring speed is often required in combination with high measuring precision. Amongst the measuring equipment which meets these requirements there are arrangements which are based on a method using a type of triangulation measurement with the aid of lasers.

The principle of triangulation measurement is well known and its use in a laser distance measuring device will therefore only be described briefly:

The monochromatic light from a laser source is focused into a narrow beam and illuminates a measurement area on a measured object. A receiver is placed close to the laser source, said receiver thus "seeing" the measurement area from the side. The receiver is provided with a detector which detects the light reflected from the measurement area and thereby also its position on the detector. When the distance between the measuring arrangement and the measured object changes the image of the measurement area will be displaced on the surface of the detector. Since the position of the detector with respect to the measurement beam is known, the distance between the measuring arrangement and the measured object can easily be calculated using known trigonometrical methods. The equipment can alternatively be calibrated by measurements of known distances The monochromatic laser light allows good possibilities of generating a narrow and well-defined measurement beam. The measurement area which is illuminated by the beam will of course have a certain extension in space. When the position of the measurement area is to be determined, it is therefore always necessary to take the measurement to the same point within this. The capability of the measurement equipment to determine the location of this measurement point becomes the determining factor for the measurement precision which can be obtained.

In a well-focused laser beam the distribution oft he light intensity is symmetrical taken from the centre of the beam. It is therefore comparatively simple to determine the position of the centre of the beam by measuring the light intensity. This normally occurs by firstly determining the position of the points where the light intensity is 50% of the maximum. Since the middle point is positioned midway between these points its position can be easily determined therefrom. This middle point could therefore be used as the measurement point.

A problem occurs however when the position of the measurement point is to be determined by means of a detector which measures the light reflected from the measurement area. When monochromatic laser light impinges upon the surface it is diffusely reflected. Since the diffuse reflection is influenced by the surface finish of the measured object the reflection in different directions will vary randomly. The light from different points on the surface will therefore interfere. This means that the measurement area for an observer will appear "grainy", a phenomenon which is well known under the term "speckle". From a measurement point of view the phenomenon is serious since this means that the determination of the 50%-points—and thereby also the measurement point—will be randomly dependent on the appearance of the measurement area. This uncertainty in the determination of the measurement point thus limits the precision of the measuring system.

SUMMARY OF THE INVENTION

The object of the invention is therefore to define a method which reduces the effect of "speckle" and which thereby improves the measurement precision for laser distance measurement devices.

A further object of the invention is to arrive at a laser distance measurement device where the measurement precision is improved due to the fact that the influence of "speckle" is reduced.

Said object is achieved by a method according to the present invention, the features of which are defined in appended claim 1.

Said object is also achieved by an arrangement according to the present invention the characteristic features of which are defined in appended claim 5.

DESCRIPTION OF THE FIGURES

The invention will now be described in more detailed with reference to an embodiment and to the accompanying drawings, in which.

DESCRIPTION OF PREFERRED EMBODIMENTS

Figure 1:
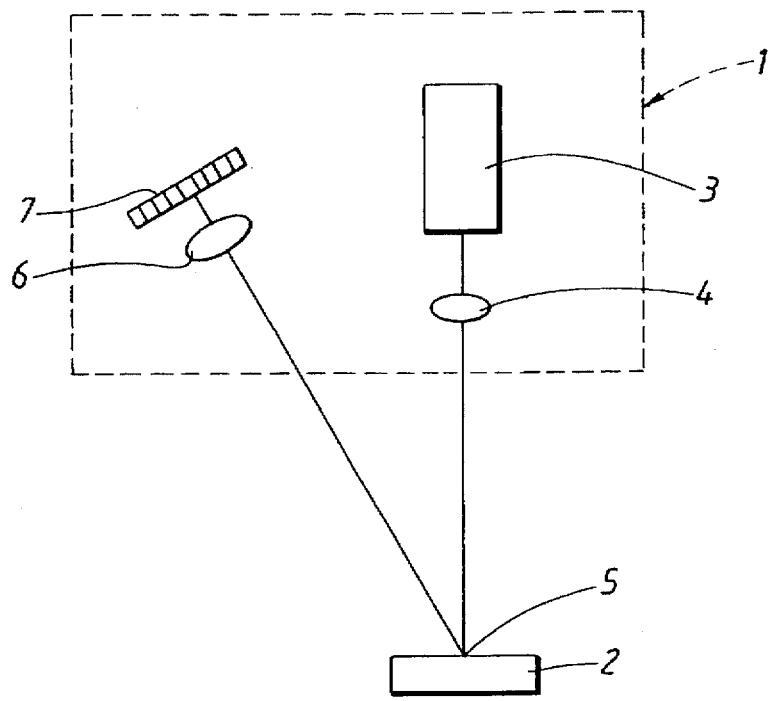
FIG. 1 shows a known arrangement for measuring distance.

In order to aid understanding of the invention an example of a measurement arrangement according to currently known technology will be described by way of introduction with reference to FIGS. 1 and 2. The measurement arrangement in FIG. 1 is denoted by the reference numeral 1. With the aid of the measurement arrangement the distance to a measured object 2 will be measured. For this purpose the measurement arrangement is provided with a laser source 3 which emits a monochromatic light. With the aid of an optical device 4 the emitted light is focused into a narrow beam which illuminates a measurement area 5 on the measured object. The light is reflected diffusely and a part of the reflected light reaches an optical receptor device 6 located on one side of the laser source, said receptor device re-producing the measurement area on the detector device. The detector device in this application is a line detector 7 which comprises a large number of detector elements positioned close to each other.

If the distance between the measurement arrangement an the measured object changes, the image of the measurement area on the detector will be moved to new detector elements due to the fact that the detector device is placed at the side of the laser source and the emitted laser beam. The number of detector elements therefore has to be large enough that it corresponds to the complete distance range within which the measurement device is intended to be used. The width of the line detector is, on the other hand, appreciably smaller than the diameter of the image of the measurement area. By determining where on the detector the measurement area should be reproduced, by using an electronic evaluation device (not shown) connected to the detector, the distance can be determined with the aid of trigonometrical calculations. The measurement arrangement can alternatively be calibrated by measurement of known distances.

Figure 2:
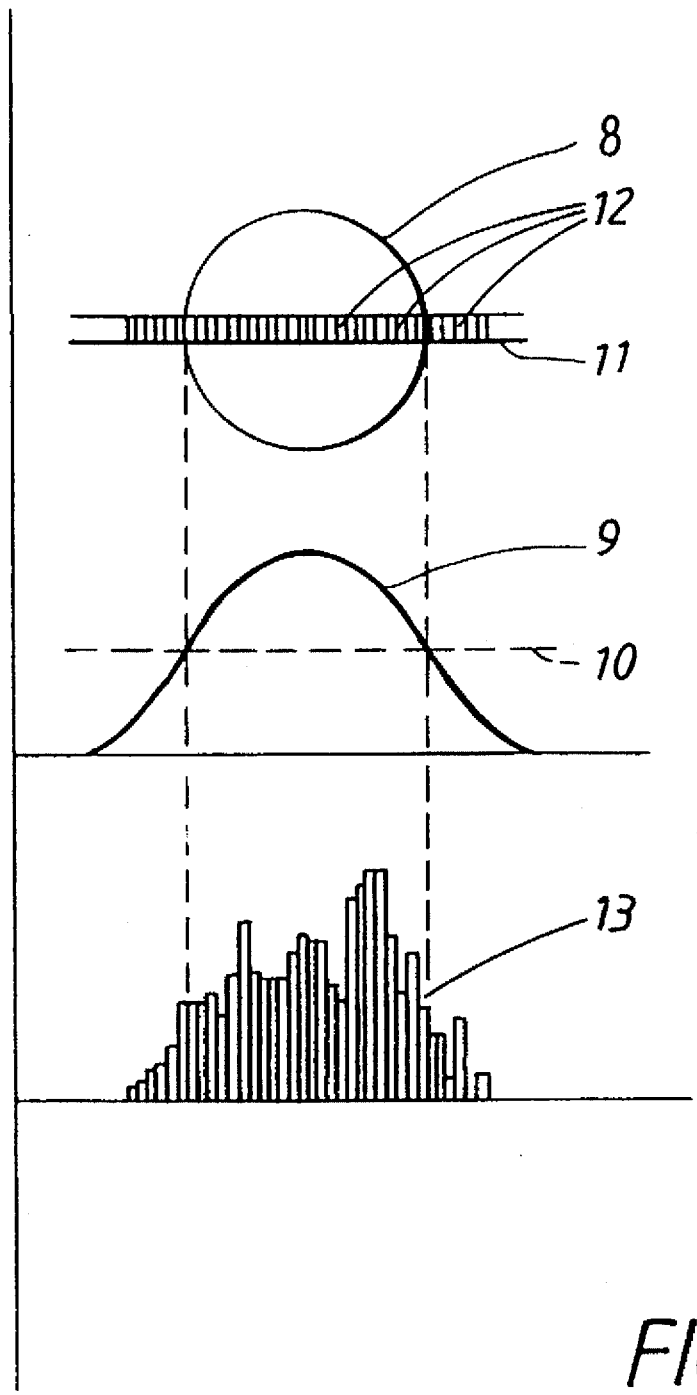
FIG. 2 shows the light intensity distribution on a laser beam before and after reflection.

FIG. 2 shows a measurement area 8 which is illuminated by a small measurement beam of laser light. The light intensity distribution in the area is shown in the form of a curve 9, the vertical axis of which represents the light intensity and the horizontal axis of which represents the position along a line through the mid-point of the beam. In the figure a line 10 has also been drawn. In the shown example the line corresponds to the light intensity level which constitutes 50% of the maximum light intensity of the beam, although other levels can be used. With the light intensity distribution which is shown by curve 9, the points where the line 10 cut the curve are easy to determine and in this way it is also easy to determine a measurement point.

If the measurement area 8 is represented on a detector 11 which consists of a number of detector elements 12, the output signal from the individual detector elements will represent the light intensity distribution along the detector. Due to the previously described problem concerning speckle, the light intensity distribution will be very irregular as is shown in the bar diagram 13. In this diagram each bar corresponds to the light intensity measured by one detector element. Since the surface of the measured object influences the diffuse reflection of the laser light, the light intensity distribution over the detector will be modified even when the measured object is displaced sideways, i.e. at a constant distance from the measurement arrangement. These variations make the determination of the measurement point uncertain. This uncertainty puts a limit on the measurement precision which can be obtained.

Figure 3:
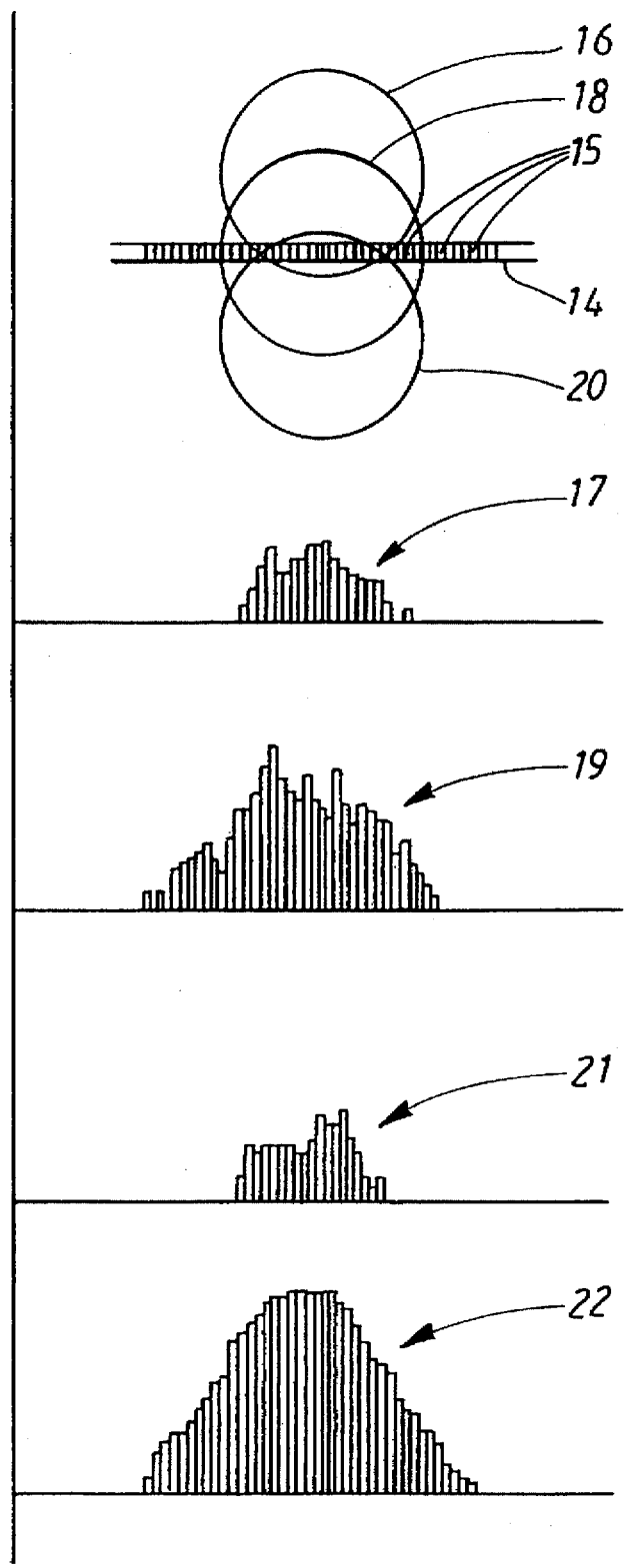
FIG. 3 shows examples of the light intensity measured and stored by the detector arrangement.

It will now be described, in connection with FIG. 3, how the aforementioned uncertainty can be reduced by the invention.

An important feature of the invention is that the whole image of the measurement area 8 is scanned. This occurs with the aid of a device described below and which means that the image of the measurement area may move transversely across the detector. FIG. 3 shows examples of the positions (16, 18, 20) which the image assumes during scanning with respect to the detector 14 which consists of a number of detector elements 15. When the image is positioned in a first location 16 the output signals of the detector elements can have the appearance as shown in the bar diagram 17, in which the height of the bars shows the light intensity detected by each of the detector elements. The diagram thus represents the distribution of the light intensity along a cord of the image of the measurement area.

In a second measurement location 18 the light intensity distribution along a diameter of the image of the measurement area is detected and this is represented in diagram 19. In a corresponding manner the diagram 21 represents the light intensity distribution along a second cord on the image of the measurement area where the image is in position 20.

It has shown itself to be so that if the output signal from each of the detector elements is accumulated during the period that the image of the measurement area moves transversely over the detector, the accumulated output signals will result in a light intensity distribution according to diagram 22, i.e. a form which corresponds well to the light intensity distribution before the diffuse reflection. By accumulation a light intensity distribution is obtained which is thus basically independent of speckle. By means of the invention it is therefore possible to precisely determine a measurement point in the above described manner. Practical experiments have shown that an improvement of the measurement precision by a factor of about 3 can be obtained.

The accumulation of the output signals from the detector elements can occur in different ways. The signal from each detector element can thus be continually integrated during the period that the image of the measurement area moves transversely over the detector. A second method implies that the output signals of the detector elements are sampled during the period that the image of the measurement area moves across the detector. The sampled values can thereafter be processed using statistical methods in order to determine the mean values and standard deviations etc. The accumulation of the detector output signals can occur during one or a plurality of image scannings.

Figure 4:
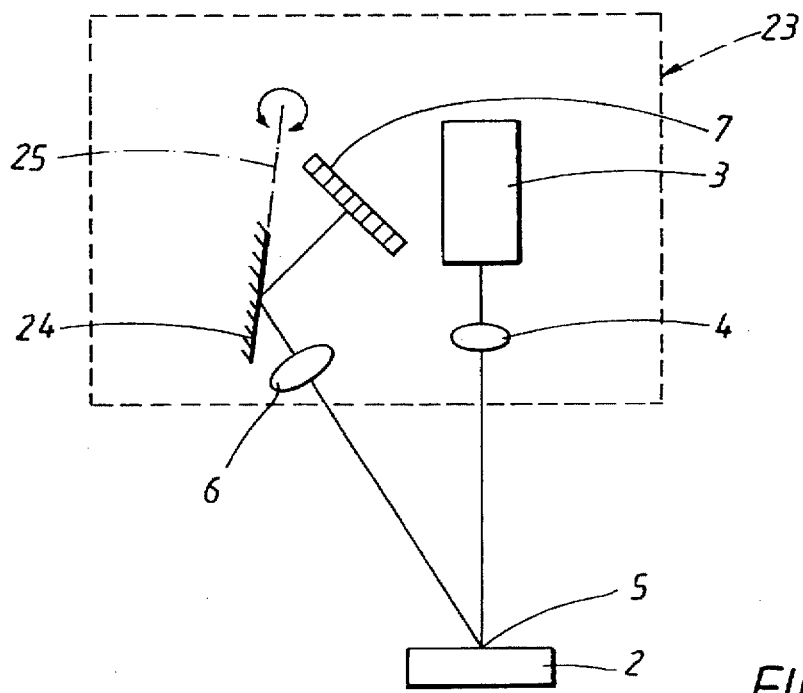
FIG. 4 shows an arrangement for measuring distance in accordance with the invention.

FIG. 4 shows a measurement arrangement in which the above-described method is applied. The new measurement arrangement 23 comprises a number of components which are the same in function as those in the measurement arrangement 1 (FIG. 1). These components have been given the same reference numerals as in FIG. 1. The measured object 2 and the measurement area 5 have also been given the same reference numerals.

The measurement arrangement 23 is furthermore provided with a scanning device. This is constituted by a mirror 24, placed in the beam path between the measurement area and the detector. The support of the mirror is so arranged that the mirror, with the aid of a suitably formed drive arrangement (not shown), can rotate or move with a forwardly of rearwardly directed movement relative to an axis 25. The scanning of the image is thereby repeated in a particular direction, forwardly and rearwardly directed respectively. The detector is connected to an electronic evaluation device (not shown) where the accumulation of the output signals from the detector occurs.

Apart from said arrangements, measures have to be taken of course in order to synchronize the movements of the mirror with the electronic evaluation device. These measures are however well known for the skilled man and therefore do not need to be described in this connection.

In the above example the measurement area 8 has been shown with a circular form. By suitably arranging the optical device 4, it is possible to give the measurement area other shapes, for example elliptical or rectangular. The measured object is thereby illuminated so that the image of the measurement area has its largest extent transverse to the longitudinal direction of the detector. When the image of the measurement area is scanned, the form of the image will mean that the output signals from the detector elements, which detect the edge of the image, will be obtained during a longer period than with circular images. This leads to a greater certainty in the determination of the edge of the image and thereby an additionally increased measurement precision.

It is also suitable to give the beam emitted from the laser source a conical form so that the size of the illuminated measurement area increases with increasing measurement distance. By means of this measure it is possible, independent of the measurement distance, to achieve an optimal size relationship between the image of the measurement area and the detector elements.

In certain applications a mechanically moveable mirror arrangement can be unsuitable. In these cases it is possible to replace the line detector 7 by a detector of a matrix type, i.e. a detector which can be seen as a number of line detectors placed close to each other. By choosing a detector with so many lines that its total width is at least as large as the image of the measurement area, an electronic scanning device can be used for scanning the image. In this case the output signals from the detector elements are accumulated in all the lines which are covered by the image of the measurement area. This embodiment implies a more complicated detector and thereby also a more complex electronic evaluation device, but this can be preferable where difficult mechanical conditions exist.

In a further embodiment the scanning occurs by means of the movable mirror being replaced by an arrangement which moves the detector sideways forward and back.

The invention is not limited to the embodiments described above and shown in the drawings but can of course be varied within the scope of the appended claims.

What is claimed is:

1. A method of measuring a distance, comprising:
    illuminating an area of a measured object with light from a laser-light source which, after reflection, produces an image of said area on a detector arrangement located offset from a line through said laser source and the illuminated area; said detector arrangement comprising at least one line of detector elements;
    displacing said image of said area across said at least one line of detector elements; and
    sampling and accumulating a light intensity-dependent output signal from each detector element as the image is displaced.

2. A method according to claim 1, wherein said displacing step further comprises displacing said image of said area in a direction transverse to said at least one line of detector elements.

3. A method according to claims 1 or 2, wherein said step of sampling and accumulating said output signal further comprises integrating said output signal from each said detector element during said displacing step.

4. A method according to claims 1 or 2, wherein said sampling and accumulating step further comprises the steps of sampling said output signals from each said detector element at repeated intervals during said displacing step, and processing said output signals using statistical methods after said displacing step is complete.

5. A method according to claims 1 or 2, wherein said illuminating step further comprises illuminating said area so that said image of said area has a larger extent transverse to the longitudinal direction of the detector arrangement than in its longitudinal direction.

6. A method according to claims 1 or 2, wherein said illuminating step further comprises illuminating with laser light having a conical form.

7. An apparatus for measuring distance having a source for laser light which illuminates an area on a measured object and, after reflection, produces an image of the area on a detector arrangement having at least one line of detector elements, said apparatus comprising:
    a displacing device for displacing the image of the area across said at least one line of detector elements; and
    an evaluation device for sampling and accumulating said output signals from each said detector element obtained during displacing.

8. An apparatus according to claim 7, wherein said displacing device further comprises a moveable mirror placed between the measured object and the detector arrangement for displacing the image of the area across the surface of the detector arrangement.

9. The apparatus according to claim 8, wherein said moveable mirror is rotatable for forwardly and rearwardly directed displacement.

10. The apparatus according to claims 7 or 8, wherein said detector arrangement is a line detector.

11. A method for measuring a position of a laser light beam reflected from an object, comprising the steps of:
    scanning said light beam across a detector array; and
    integrating signals from said detector array across the width of said light spot to average out speckle.

* * * * *

UNITED STATES PATENT AND TRADEMARK OFFICE
CERTIFICATE OF CORRECTION

| | | |
|---|---|---|
| PATENT NO. | : | 5,673,111 |
| DATED | : | September 30, 1997 |
| INVENTOR(S) | : | Nyquist |

It is certified that error appears in the above-identified patent and that said Letters Patent is hereby corrected as shown below:

Column 1, line 49, "oft he" should read --of the--.

Column 2, line 34, "on" should read --in--.

Column 2, line 62, "an" should read --and--.

Column 6, line 47, "spot" should read --beam--.

Signed and Sealed this

Twenty-third Day of December, 1997

*Attest:*

BRUCE LEHMAN

*Attesting Officer*       *Commissioner of Patents and Trademarks*